Patented Jan. 30, 1934

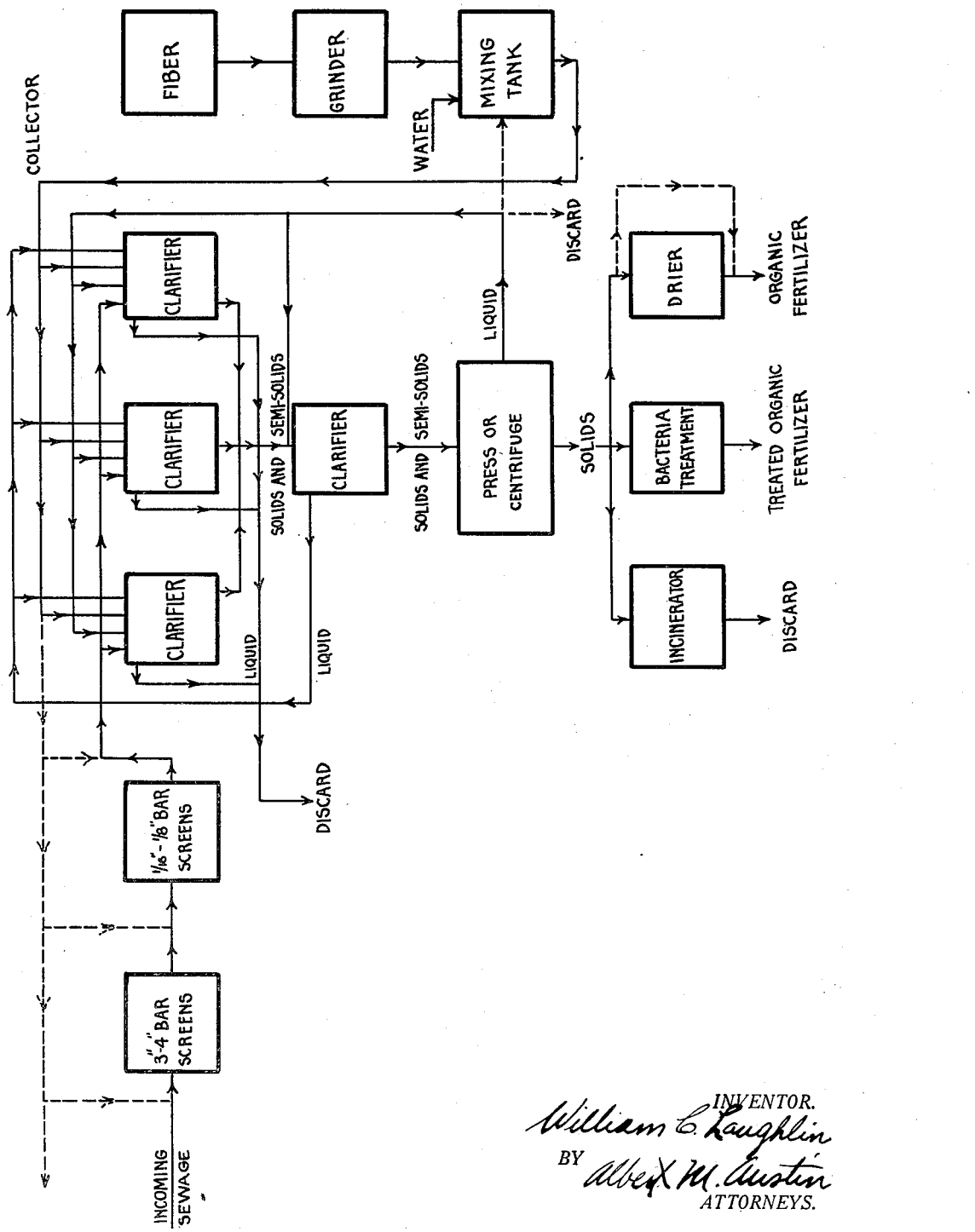

1,945,051

UNITED STATES PATENT OFFICE 1,945,051

METHOD OF TREATING LIQUIDS

William C. Laughlin, Glendale, Calif., assignor, by mesne assignments, to Filtration Holding Corporation, New York, N. Y., a corporation of Delaware Application April 5, 1930. Serial No. 441,866

4 Claims. (Cl. 71—10)

This invention relates to a process for treating liquids containing solids in suspension therein, and more particularly to a new and improved process for treating sewage for removing suspended particles and discharging the liquid, free from solids, in a clear condition. This liquid is in such a satisfactory state that there is no polution of the stream into which it may be discharged.

Sewage at present in sewer lines consists of small amounts of solids in suspension, a small amount of solids in solution and an appreciable quantity of grease, with a very large quantity, in proportion, of water. For sanitary reasons it is desirable to separate out and recover the suspended solids and to discharge the water free from these solids and free from injurious bacteria. It is also desirable to remove and separate the grease without permitting the same to clog the screens or settling apparatus or to otherwise interfere with the efficient operation of the process.

In accordance with the present invention the smaller solids are removed in clarifier tanks in which they are permitted to settle out of the liquid. In order to assist in the removal of the grease and to prevent the same from clogging the apparatus a collecting agent is applied which is capable of absorbing, enmeshing or otherwise collecting the grease and other undesired particles and solids and causing them to build up into particles of an appreciable size. The collecting material also prevents the particles from breaking down under pressure and immpeding the separation in filter presses, centrifugal apparatus or other devices.

The invention also provides for treating the solids to render them suitable for fertilizer, either with or without previous bacteria treatment.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which The figure is a flow sheet representing the various steps of the present process.

In the following description and in the claims parts will be identified by specific names for convenience, but they are intended to be as generic in their application to similar parts as the part will permit.

The present process is carried on by passing the liquid such as sewage through a plurality of screens for removing the coarser particles and then applying the same to a clarifier apparatus in which the solids are separated and the water is largely removed therefrom. A collecting medium is applied to the sewage either in the clarifier apparatus or previous to application thereto and causes the grease and other particles to coalesce into comparatively large particles which also settle and separate, carrying therewith the above mentioned solids.

The solids and semi-solids from the clarifier are treated with suitable apparatus for further elimination of water as by a filter press or centrifuge and are then either passed to the incinerators or are used for fertilizer either with or without bacteria treatment.

The process, as illustrated in detail on the flow sheet, comprises passing the incoming sewage through a three to four inch screen which removes the large particles, such as blocks of wood, and prevents them from clogging the remainder of the apparatus. The material is then passed through a finer screen, such as one-sixteenth inch to one-eighth inch mesh, which removes the remainder of the large particles which would decrease the efficiency of the clarifier, particularly the floating substances which would be difficult to remove in the clarifier.

The liquid flow is then applied to the clarifying apparatus which may comprise a plurality of clarifiers connected in parallel if the nature of the material and the quantity of sewage so requires. The clarifiers comprise a device in which the liquid is caused to flow in an upward direction at a comparatively slow rate so that the heavier solid particles separate from the liquid and settle to the bottom. The upward stream of liquid may be passed through a clarifier medium such as sand, which removes the remainder of the solids and of the grease which collects on said collector medium and forms particles of sufficient size to fall through the liquid into the sludge hopper. It is obvious that any desired type of clarifier may be employed for this purpose. A particular type is disclosed in the copending application of William C. Laughlin, Serial No. 368,836, filed June 6, 1929, for Clarifier.

The clarified liquid from the above mentioned clarifiers is substantially free from solids and may be discarded in any desired manner, as by being applied to a flowing stream of water. The solids and semi-solids may be removed from the sludge hoppers of the various clarifiers and applied to a further clarifying apparatus which may comprise an additional clarifier tank of capacity less than that of the first mentioned group of clarifier tanks inasmuch as the bulk of the water has been separated and discarded. This second tank may be of construction similar to the first group of tanks and may be provided with a discharge apparatus for constantly removing the settled sludge while the liquid is removed and returned to the first group of clarifiers. A particular type of discharge apparatus which may be employed has been shown in a copending application of William C. Laughlin, Serial No. 413,794, filed December 13, 1929, for Discharge apparatus. It is obvious, however, that the number and arrangement of tanks may be varied as desired.

The solids and semi-solids removed from the sludge hopper of this second clarifier may be further treated, if necessary, to substantially eliminate the liquid therefrom. For this purpose they are passed through a filter press or a centrifuge of well known construction which separates the liquids and leaves the solids in a substantially dry condition. The liquid may be returned to either of the clarifiers described above and further treated to recover any suspended particles which may remain therein.

The solids from the press or centrifuge may be passed to an incinerator and discarded, or they may be used directly as organic fertilizer with or without drying, dependent upon the condition of the solids and the type of fertilizer required. If desired, the solids may be given a bacteria treatment and used as treated organic fertilizer.

In carrying out the present invention for the removal of undesired material in suspension in a liquid, a collector is added to the liquid under such conditions that the material adds to or combines with the collector to form a mass which is readily separated from the liquid stream. If the liquid is in a settling tank or clarifier the mass is such that it readily settles out of the liquid flow. In the case of a screen the liquid flow causes mechanical movement of the mass thereover, thereby sweeping the surface of the screen free from the undesired material. The mass appears to have a wiping action when it is somewhat soft and pliable. In the event the collector has picked up gritty materials or the like then there is a wiping, scraping and abrasive action, or the like. Thus the screen or like apparatus is kept clean during running operations.

In the case of liquid containing grease in suspension, a sufficient quantity of collecting agent is introduced into the grease-bearing liquid so as to absorb the particles of grease and form therewith a semi-solid mass. This mass is less sticky than the grease particles themselves and the tendency to stick to and clog apparatus is minimized and eliminated in most instances. If the liquid flow or stream is passed through a set of screens, the mass made up of the grease absorbed and the collecting agent is such that the screens are automatically cleaned as the mass particles or bodies are moved thereover by the liquid flow. The material which has been collected adheres to or is included within or passed into the body or lump of the collector which has a greater holding power for the material than the metal of the screen since the collector has a greater affinity for the grease than the metal.

With fine silt the collector operates to mechanically entangle the particles and form a mass which settles to the bottom of the container. The entangling may be by adhesion, inclusion, occlusion, impregnation or in divers other ways.

Various types of collecting agents may be employed in this process, depending upon the particular substance under treatment and the percentage and form of suspended material contained therein. Waste paper, paper pulp, sawdust, paper boxes, cotton and wool, and other fibrous material preferably in the form of a water suspension, have been found suitable in certain instances. As a collector for greases or other foreign substances, it is preferable to use primarily some form of wholly or partially disintegrated old or new pulp fiber such as for instance from box-board, straw-board, wrappers or old waste papers made from a pulp that has a comparatively long or coarse or free fiber, to which the foreign substances will cling. It might also be possible to use a disintegrated rag pulp, jute or other vegetable fiber, cotton linter or other fibrous material to which foreign substances will cling.

To a small degree foreign substances may cling to a finer pulp from the finer grades of paper but this is problematical as the finer pulps disintegrate to such small particles that it is difficult for such substances to cling to them. In any event any of the so called finer pulp now present in sewage does not occur in sufficient quantity to act as a collector.

This fiber is finely ground in a suitable grinding apparatus and applied to a mixing tank where it is thoroughly incorporated in a large quantity of water or other desired liquid by suitable beating or stirring apparatus and forms a pulp. The fiber suspension is then applied to the sewage either in the clarifier tanks or previous to application thereto, as, for example, prior to the passage through the various screens. The collector may also be added to the sewage at any convenient point, as by being applied to a sewer at a distance from the separating apparatus.

The collector in the clarifier tanks serves to absorb the grease particles and cause them to more readily settle through the liquid into the sludge hopper, from which it is removed together with the solids and semi-solids from the incoming sewage. The collector and grease are passed together through the remainder of the process and prevent the further apparatus from becoming clogged by the grease particles.

When the collector is applied prior to the various screens, it absorbs the grease particles and collects the solids and prevents them from clogging the screens. The proportion of collector to grease and solid particles may be such that the screens are practically self-cleaning by reason of the fact that the grease is collected by and into the fiber particles to form a fairly large mass which wipes over the screens in being separated from the flow. Thus the masses act as cleaning elements. If the fiber is treated at a point removed from the clarifying apparatus, the cost of the operation may be reduced by applying the same to a conveniently located sewer, thereby avoiding the cost of transporting the collector to the clarifying plant.

It is to be noted that the liquid from the press or centrifuge may be applied to the mixing tank in which the clarifier is treated or may be discarded instead of being recirculated through the clarifier tanks, provided the same is sufficiently free from solid particles. The amount of collecting agent which is employed will depend upon the particular consistency of the liquid under treatment, and it may comprise 25% to 100% of the dry weight of the solids present therein.

The above described process is particularly suitable for use in sewage disposal plants where the sewage must be purified before being applied to a flowing stream of water. This process provides for the efficient removal of the solid particles from the sewage and for the utilization of those particles as an organic fertilizer. Furthermore, the various clarifying steps efficiently separate the liquid from the solid and reduce the amount of liquid which must be subsequently removed in the dryer.

The process is also applicable to other materials such as clay suspensions and is not to be limited to the treatment of sewage which has been described by way of illustration only.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of treating sewage which comprises passing said sewage through screens to remove the coarse floating particles, applying thereto a collecting agent comprising a finely divided, fibrous material in water suspension, said agent being capable of absorbing grease particles and forming a semi-solid mass, passing said sewage and collecting agent through a clarifier apparatus for removing a portion of the solid free liquid, treating the solids and semi-solids in a second clarifying apparatus for the removal of further liquid therefrom, recirculating said liquid into said first clarifying apparatus for further treatment, and treating the resultant solids and semi-solids for the further elimination of liquid and the production of solids.

2. The process of treating sewage which comprises passing said sewage through a clarifier apparatus for the removal of solid free liquid, passing the sludge from said apparatus through a second clarifier apparatus for the removal of further quantities of liquid which is returned to said first clarifier apparatus, and treating the sludge from said second apparatus for the substantial elimination of the remaining liquid which is recirculated in said first and second apparatus.

3. The process of treating sewage which comprises passing said sewage through screens to remove the coarse floating particles, applying thereto a collecting agent comprising a finely divided, fibrous material in water suspension, said agent being capable of absorbing grease particles and forming a semi-solid mass, passing said sewage and collecting agent through a clarifier apparatus for removing a portion of the solid free liquid, treating the solids and semi-solids in a second clarifying apparatus for the removal of further liquid therefrom, recirculating said liquid into said first clarifying apparatus for further treatment, treating the resultant solids and semi-solids for the further elimination of liquid and the production of solids, and treating the solids to produce organic fertilizer.

4. The process of treating sewage which comprises passing said sewage through a clarifier apparatus for the removal of solid free liquid, passing the sludge from said apparatus through a second clarifier apparatus for the removal of further quantities of liquid which is returned to said first clarifier apparatus, treating the sludge from said second apparatus for the substantial elimination of the remaining liquid which is recirculated in said first and second apparatus, and treating the resultant solid to produce organic fertilizer.

WILLIAM C. LAUGHLIN.